United States Patent
Li et al.

(10) Patent No.: US 11,945,067 B2
(45) Date of Patent: Apr. 2, 2024

(54) AUTOMOBILE HUB FIXTURE, MACHINING DEVICE, AND PRODUCTION LINE

(71) Applicants: QINGDAO UNIVERSITY OF TECHNOLOGY, Shandong (CN); HANERGY (QINGDAO) LUBRICATION TECHNOLOGY CO., LTD., Shandong (CN)

(72) Inventors: Changhe Li, Qingdao (CN); Minkai Chen, Qingdao (CN); Zongming Zhou, Qingdao (CN); Naiqing Zhang, Qingdao (CN); Shuaiqiang Xu, Qingdao (CN); Dewei Liu, Qingdao (CN); Bingheng Lu, Qingdao (CN); Yanbin Zhang, Qingdao (CN); Xiaoming Wang, Qingdao (CN); Min Yang, Qingdao (CN); Bo Liu, Qingdao (CN); Xin Cui, Qingdao (CN); Mingzheng Liu, Qingdao (CN); Xifeng Wu, Qingdao (CN)

(73) Assignees: QINGDAO UNIVERSITY OF TECHNOLOGY, Qingdao (CN); HANERGY (QINGDAO) LUBRICATION TECHNOLOGY CO., LTD., Qingdao (CN)

( * ) Notice: Subject to any disclaimer, the term of this patent is extended or adjusted under 35 U.S.C. 154(b) by 342 days.

(21) Appl. No.: 17/550,450

(22) Filed: Dec. 14, 2021

(65) Prior Publication Data
US 2023/0028737 A1    Jan. 26, 2023

(30) Foreign Application Priority Data
Jul. 20, 2021   (CN) .......................... 202110819415.1

(51) Int. Cl.
B23Q 3/00 (2006.01)
B05B 13/02 (2006.01)
B23Q 3/06 (2006.01)

(52) U.S. Cl.
CPC .......... *B23Q 3/062* (2013.01); *B05B 13/0221* (2013.01)

(58) Field of Classification Search
CPC ....... B23P 11/00; B23P 11/005; B23P 11/022; B23P 19/00; B23P 19/027; B23P 19/04; B23Q 3/06; B23Q 3/061; B23Q 3/082
See application file for complete search history.

(56) References Cited

U.S. PATENT DOCUMENTS 11,167,394 B2 * 11/2021 Roberts ................... B25B 27/16
11,305,405 B2 * 4/2022 Almqvist ................ B25B 5/147
(Continued)

*Primary Examiner* — Lee D Wilson
(74) *Attorney, Agent, or Firm* — JCIPRNET

(57) ABSTRACT

An automobile hub fixture includes a fixture body and a positioning apparatus. The fixture body includes a fixed platform and a plurality of clamping claws arranged at intervals in a circumferential direction of the fixed platform. The clamping claws are configured to clamp an outer rim of a hub. The plurality of clamping claws are connected to a driving member by using a linkage, and the driving member drives the clamping claws to radially move along the fixed platform. The positioning apparatus includes a movable platform slidably connected to the clamping claws. A positioning module configured to position an inner rim or the outer rim of the hub is mounted to the movable platform. The machining device includes a fixture, a machine tool, and a minimal quantity lubrication apparatus. The production line includes a machining device, a loading system, a loading and unloading manipulator, and a catching table.

10 Claims, 12 Drawing Sheets

(56) References Cited

U.S. PATENT DOCUMENTS

| | | | |
|---|---|---|---|
| 11,648,647 B2* | 5/2023 | Chu | B25B 5/061 269/227 |
| 11,679,476 B2* | 6/2023 | Chen | B25B 27/062 29/256 |
| 2023/0028737 A1* | 1/2023 | Li | B23B 5/02 |

* cited by examiner

AUTOMOBILE HUB FIXTURE, MACHINING DEVICE, AND PRODUCTION LINE

TECHNICAL FIELD

The present invention relates to the technical field of hub machining, and in particular, to an automobile hub fixture, a machining device, and a production line.

BACKGROUND

Automobile hubs are developing toward diversification and individuation. Therefore, a multi-specification, multi-size, variable batch hub production mode is formed. For a hub having a different specification and size, a different machining device is often required to meet the machining needs during the machining. With an increase in hub types, there are also increasingly more requirements for the device. A hub fixture is a necessary tool for hub machining, which has a very important influence on production efficiency and production quality of a hub machining and production line.

The inventor found that the current hub fixture has problems that the positioning accuracy cannot meet a machining requirement and cannot meet the requirement for production efficiency in the machining of a multi-specification hub. For example, a hub fixture is disclosed in the prior art. The design of the fixture reflects a certain degree of flexibility, but the preliminary preparation work is too troublesome when the fixture is about to be used. For a task of producing hubs having different specifications and sizes, the fixture needs to be adjusted constantly, which is unable to adapt to the needs of automation. An automobile hub fixture is disclosed in the prior art. The automobile hub fixture is designed to have an arc-shaped clamping pad having certain elasticity and a range of motion, thereby further expanding a range of limiting different hubs. However, this fixture cannot realize the clamping of the hub having a different thickness, and fails to realize self-positioning before the clamping. The quality problem of the blank may cause an error in centering during the clamping, resulting in an excessively large deviation. In this way, the subsequent machining errors are gradually amplified, eventually damaging the workpiece and causing an unnecessary loss.

In addition, a current hub machining device basically still adopts the old-fashioned and island-type machining with three machine tools manually operated, and the lubrication method is flood lubrication. The conventional flood lubrication is to continuously spray a large amount of cutting fluid to a machining area during the machining of a machine tool to take away the large amount of heat and cuttings generated by the cutting. However, during the machining, flood lubrication requires the use of large quantities of cutting fluid, which causes splashing of the cutting fluid. Since a worker operates a machine tool, the cutting fluid will affect the health of the worker. And the cutting fluid is extremely harmful to the environment and has extremely high processing costs. Therefore, the costs are increased. Furthermore, the island-type hub machining does not distinguish between rough machining, semi-finishing, and finishing, causing the machining methods to have a same positioning reference, resulting in a low machining accuracy.

For a hub machining and production line, in addition to problems of fixture positioning and a machining link, there are also problems such as an ineffective connection of a loading and unloading process and a small quantity of hubs to be conveyed at a time. As a result, the production line cannot meet the requirements of the hub for the quality and efficiency.

SUMMARY

In view of the deficiencies in the prior art, an objective of the present invention is to provide an automobile hub fixture, a machining device, and a production line. A positioning apparatus is disposed on the fixture, so as to realize self-positioning of a hub and be applicable to the clamping of a hub having a different specification and size. Machining includes minimal quantity lubrication machining, so that the requirement for machining of a hub can be satisfied and the machining quality can be ensured. In addition, casting to machining and outputting of a hub is continuous, improving the machining efficiency.

To achieve the foregoing objective, the present invention is implemented by using the following technical solutions:

According to a first aspect, an embodiment of the present invention provides an automobile hub fixture, including:

a fixture body, including a fixed platform and a plurality of clamping claws arranged at intervals in a circumferential direction of the fixed platform, where the clamping claws are configured to clamp an outer rim of a hub, the plurality of clamping claws are connected to a driving member by using a connecting rod mechanism, and the driving member drives the clamping claws to radially move along the fixed platform; and a positioning apparatus, including a movable platform slidably connected to the clamping claws, where a positioning module configured to position an inner rim or the outer rim of the hub is mounted to the movable platform.

As a further implementation, the clamping claw includes a body, a clamping member attachable to a surface of the hub is connected to one end of the body, a gasket is disposed between the clamping member and the body, a mounting groove is correspondingly provided in each of the fixed platform and the movable platform in the circumferential direction, and the each clamping claw is slidably connected to the mounting groove.

As a further implementation, the positioning module includes a filling frame mounted to the movable platform, the filling frame is slidably connected to a plurality of internal filling parts in a circumferential direction, a connecting shaft is mounted to a center of the filling frame, and the connecting shaft is rotatably connected to a connecting frame; and the connecting frame is connected to the internal filling parts by using a link, and each internal filling part is connected to a cylinder to change an extending length of the each internal filling part relative to the filling frame.

As a further implementation, a sliding groove is symmetrically provided radially in the movable platform, the positioning module includes positioning blocks respectively disposed in the sliding grooves, the two positioning blocks are connected by using the connecting rod mechanism, one of the positioning blocks is connected to a cylinder, and a distance between the two positioning blocks is changed by the cylinder, so that the positioning blocks are attached to the outer rim of the hub.

As a further implementation, the positioning module includes a positioning plate and a connecting member, and the connecting member is perpendicular to the movable platform and is connected to the positioning plate by using a plurality of springs having different lengths, so that the positioning plate is inclined at a set angle.

According to a second aspect, an embodiment of the present invention further provides an automobile hub machining device, including the fixture. The fixture is mounted to a machine tool, and a minimal quantity lubrication apparatus is further mounted to the machine tool.

According to a third aspect, an embodiment of the present invention further provides an automobile hub machining production line, including the machining device, a loading system, loading and unloading manipulators, and a catching table, where the machining device includes a plurality of machining device, the loading system is disposed at a side of the machining device, and the loading and unloading manipulator is configured to place a hub conveyed by the loading system on the machining device and place a machined hub on the catching table.

As a further implementation, the loading system includes a first roller table, a second roller table, a third roller table, and a fourth roller table that are disposed in sequence.

The first roller table is configured to convey a detachable rack carrying a hub, the second roller table is disposed at an output end of the first roller table, and a lifting platform is mounted to a bottom of the second roller table. A material separating unit is disposed above the first roller table, and the material separating unit is used to split the detachable rack and place the detachable rack after being split on the third roller table; and a hub grabbing manipulator is disposed between the third roller table and the fourth roller table.

As a further implementation, the material separating unit includes a support frame, a rack insertion and taking apparatus is disposed on a top of the support frame by using a synchronous belt transmission mechanism, and the synchronous belt transmission mechanism drives the rack insertion and taking apparatus to move in a length direction of the support frame.

As a further implementation, a positioning roller table is disposed at an output end of the fourth roller table.

Beneficial effects of the present invention are as follows:

(1) The fixture of the present invention includes a plurality of clamping claws, the position of the clamping claw is adjusted by the connecting rod mechanism and slider driven by the cylinder by using a connecting rod mechanism driven by a cylinder, so as to be applicable to a hub having a different size and specification. The movable platform may be mated with the clamping claws by adjusting heights to realize the clamping with a different width. A buffer gasket is disposed on the each clamping claw, to avoid causing damage to a surface of a workpiece during the clamping.

(2) The self-positioning apparatus of the present invention can realize the positioning of an inner rim or an outer rim of the hub. For a first self-positioning apparatus, an internal filling part driven by a connecting rod mechanism is used to realize the positioning of an inner center of the hub, so as to ensure the accuracy by using a relatively small contact area. For a second positioning apparatus, a positioning block is driven by a link to realize the positioning of the outer rim of the hub. A positioning plate and a spring are disposed on a third positioning apparatus. Under an action of the gravity of the hub and the elastic force of the mounted spring, the positioning is achieved by means of static equilibrium. In this way, a different positioning apparatus can be selected according to an actual positioning requirement of the hub, thereby improving the adaptability of the fixture.

(3) The machining device of the present invention is a machine tool equipped with a minimal quantity lubrication apparatus. In using the machine tool, a different liquid is supplied to the machine tool according to a different rotational speed, so as to ensure the accuracy and quality of the machining, and reduce a waste of resources.

(4) Loading and unloading manipulators and a hub grabbing manipulator are disposed on the hub machining and production line of the present invention. The loading and unloading manipulators can complete continuous loading and unloading of the hub on the machine tool. The hub positioning roller table is mated with the loading and unloading manipulators to complete effective transportation of the roller tables and the hub of the machine tool, thereby realizing the automation and high efficiency of the transportation of the hub during the machining. The hub grabbing manipulator can complete the connection of a loading apparatus and a machining apparatus, so that the uninterrupted loading can be realized during the machining of the production line.

(5) The loading and unloading manipulators of the present invention form two clamping spaces, and two ends of a clamping apparatus can operate simultaneously by using a connecting rod mechanism, so as to realize the grabbing of the hub. During the loading and unloading, after a door of the machine tool is opened, a finished hub may be removed from an end clamping space, and an unmachined hub may be placed in the clamping space at an other end, so as to realize the continuous operation of loading and unloading and improve the handling efficiency.

(6) The hub grabbing manipulator of the present invention is provided with a Y-axis movable apparatus. After the hub grabbing manipulator grabs the hub from a rack, the support frame may be moved away from the lifting platform to prevent the support frame from affecting the lifting of the lifting platform.

(7) The loading system of the present invention includes a detachable rack, a material separating unit, and a plurality of roller tables. The detachable rack is composed of a plurality of detachable rack units. The detachable rack is disassembled into the rack units by using the material separating unit, and the rack unit carrying the hub is placed on the conveying roller table. By means of the cooperation of material separating unit and the roller tables, the efficient transmission of the blank hub can be realized.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

I. Fixture, II. Machine tool, III. Loading and unloading manipulator, IV. Fourth roller table, V. Hub, VI. Hub grabbing manipulator, VII. Detachable rack, VIII. Material separating unit, IX. First roller table, X. Second roller table, XI. Lifting platform, XII. Minimal quantity lubrication apparatus, XIII. Positioning roller table, XIV. Third roller table, XV. Catching table;

I-1. Fixed platform, I-1-1. Track, I-1-2. Support frame; I-2. Clamping claw, I-2-1. Track groove, I-2-2. Body, I-2-3. Track, I-3. Connecting pin, I-4. Link, I-5. Positioning apparatus, I-5-1. Movable platform, I-5-2. Movable platform, I-5-3. Movable platform, I-6. Connecting nail, I-7. Clamping member, I-8. Gasket, I-9. Movable member, I-10. Connecting member, I-11. Cylinder, I-12. Cylinder, I-13. Pressure sensor, I-14. Internal filling part, I-16. Link, I-17. Displacement sensor, I-18. Connecting frame, I-19. Connecting shaft, I-20. Cylinder, I-25. Second link, I-26. Positioning block, I-27. Cylinder, I-28. First link, I-29. Connecting pin, I-31. Displacement sensor, I-31. Positioning plate, I-33. Connecting member, I-34. Spring;

III-1. Mechanical arm, III-2. Manipulator claw, III-2-1. Clamping member, III-2-2. Clamping plate, III-2-4. Mounting plate, III-2-5. Connecting frame, III-2-4. Mounting plate, III-2-6. Slide track groove, III-2-7. Fifth link, III-2-8. Fourth link, III-2-9. Third link, III-2-10. Connecting pin, III-2-12. Connecting member; VI-1. Bottom plate, VI-2. Support frame, VI-3. Mechanical claw, VI-9. Synchronous belt mechanism, VI-10. Driving motor, VI-11. Track, VI-12. Support frame, VI-18. Synchronous belt mechanism, VI-19. Connecting frame, VI-20. Connecting member, VI-26. Driving motor; VIII-1. Support frame, VIII-2. Rack insertion and taking apparatus; XII-1. Gas filter, XII-2. Barometer, XII-3. Air pump, XII-4. Box, XII-5. Oil box, XII-6. Oil pump, XII-7. Oil pipeline, XII-8. Output pipe, XII-9. Oil-gas mixing apparatus, XII-10. Gas pipeline; XIII-1. Support leg, XIII-2. Bottom plate, XIII-3. Roller, XIII-4. First mounting plate, XIII-5. Positioning block, XIII-6. Roller, XIII-12. Second mounting plate.

DETAILED DESCRIPTION

Embodiment I

Figure 1:
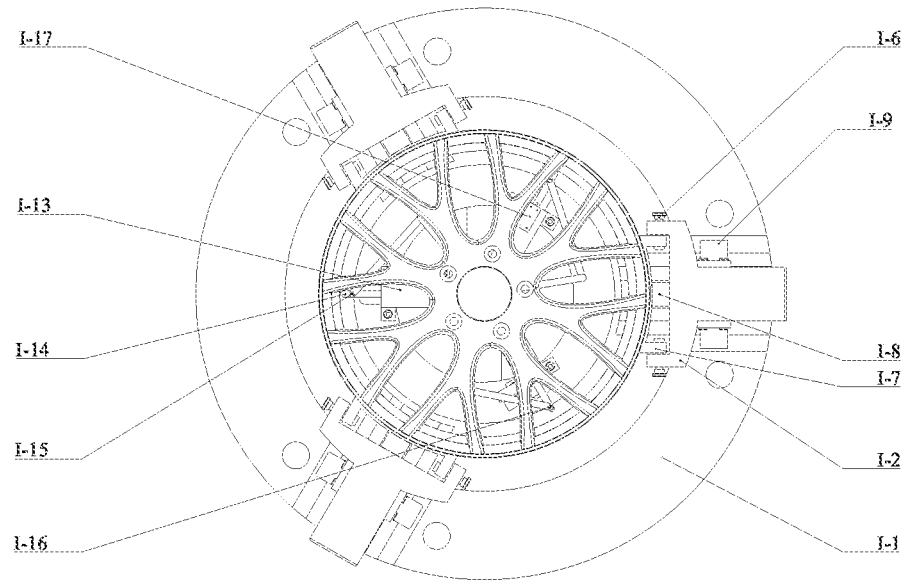
FIG. 1 is a top view of a fixture according to Embodiment I of the present invention.
Figure 2:
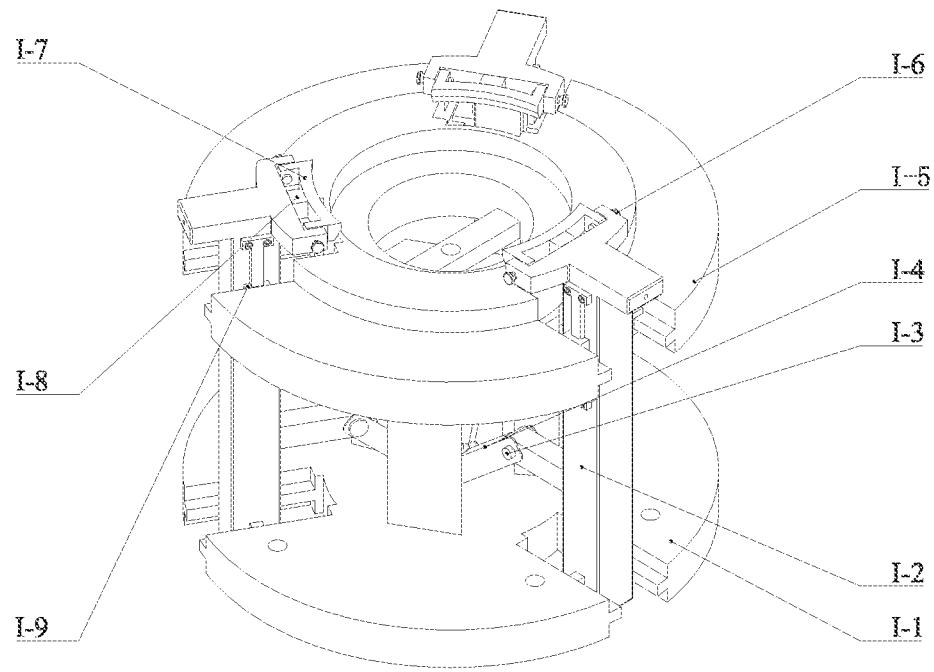
FIG. 2 is a three-dimensional view of a fixture according to Embodiment I of the present invention.
Figure 3:
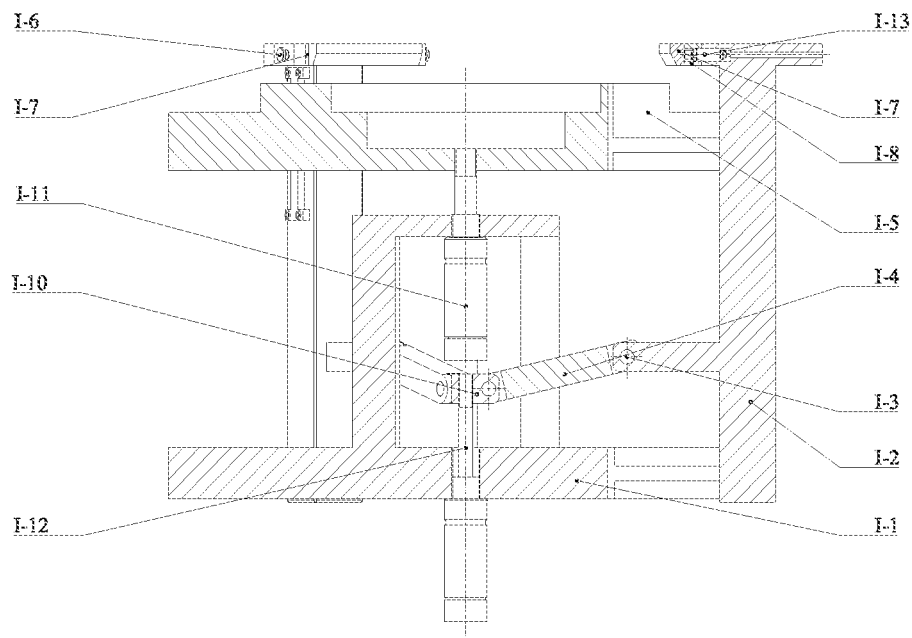
FIG. 3 is a cross-sectional view of a fixture according to Embodiment I of the present invention.

This embodiment provides an automobile hub fixture. As shown in FIG. 1 to FIG. 3, the automobile hub fixture includes a fixture body and a positioning apparatus I-5. The positioning apparatus I-5 is configured to position a hub V, and the fixture body is configured to clamp the hub V.

Specifically, the fixture body includes a fixed platform I-1, clamping claws I-2, a connecting rod mechanism and the like. A plurality of clamping claws I-2 are mounted in a circumferential direction of the fixed platform I-1. Each clamping claw I-2 is connected to a cylinder I-12 by using the connecting rod mechanism, and the connecting rod mechanism is driven by the cylinder I-12 to cause the clamping claws I-2 to clamp or loosen the hub V.

Figure 4:
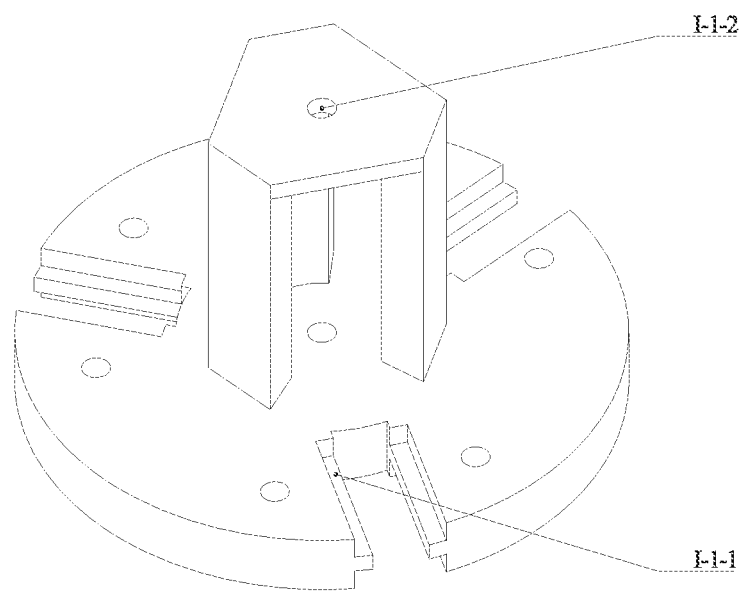
FIG. 4 is a three-dimensional view of a fixed platform according to Embodiment I of the present invention.
Figure 5:
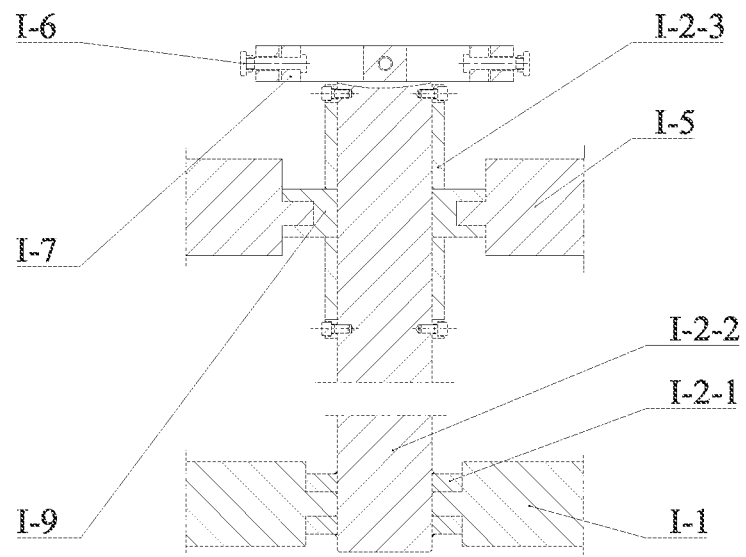
FIG. 5 is a longitudinal cross-sectional view of a fixture body according to Embodiment I of the present invention.
Figure 6:
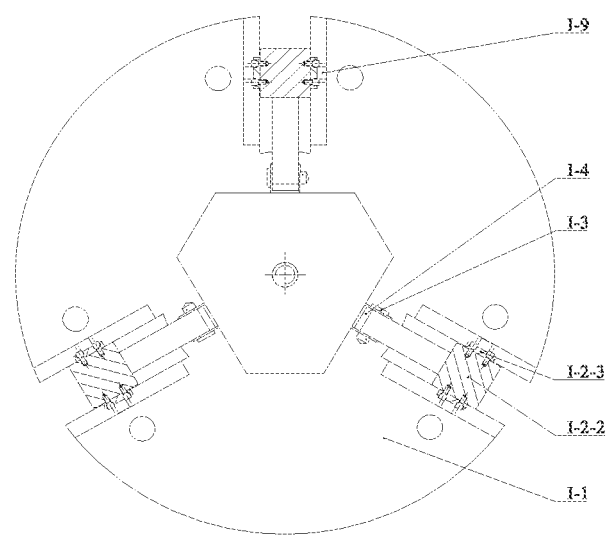
FIG. 6 is a top cross-sectional view of a fixed platform according to Embodiment I of the present invention.

Further, as shown in FIG. 4 to FIG. 6, the fixed platform I-1 is configured to connect a machine tool spindle, and a plurality of mounting grooves are provided in a circumferential direction of the fixed platform. A track I-1-1 is symmetrically mounted on two sides of each mounting groove. Each clamping claw I-2 is vertically mounted to the each mounting groove and slidably connected to the track I-1-1. In this embodiment, a cross section of the fixed platform I-1 is disposed to be circular, and three mounting grooves are provided in a radial direction of the fixed platform I-1 for mounting three clamping claws I-2, so as to stabilize the clamping. Certainly, in other embodiments, a quantity of the mounting grooves may be more than three.

The cylinder I-12 is vertically mounted to the bottom of the fixed platform I-1, and a rod of the cylinder passes through a through hole in the center of the fixed platform I-1 to be connected to the connecting rod mechanism. The cylinder I-12 drives the three clamping claws I-2 to centripetally extend and retract simultaneously, to complete the clamping and loosening of the hub V. A support frame I-1-2 is mounted at a central position of an upper surface of the fixed platform I-1. A cylinder I-11 is mounted by using a support frame I-1-2, a cylinder rod of the cylinder I-11 passes through the support frame I-1-2 to be connected to the positioning apparatus I-5, and a height of the positioning apparatus I-5 is adjusted the cylinder I-11.

Further, each clamping claw I-2 includes a body I-2-2. A track groove I-2-1 is symmetrically provided on two sides of one end of the body I-2-2. The track groove I-2-1 is mated with the track I-1-1 on the fixed platform I-1 to form a sliding pair. A track I-2-3 is symmetrically disposed on an other end of the body I-2-2. The track I-2-3 and a positioning apparatus I-5 form a sliding pair by using a movable member I-9, so as to complete the up-down movement along an axis Z. A U-shaped opening is formed on one end of the body I-2-2 to which the track I-2-3 is mounted. The U-shaped opening is connected to a clamping member I-7 by using a connecting nail I-6, and the hub V is clamped by using the clamping member I-7. The clamping member I-7 has an arc-shaped surface to fit the hub V. A gasket I-8 is disposed between the clamping member I-7 and the U-shaped opening. The gasket I-8 plays a role of buffering, so as to reduce the damage to the surface of the hub V during the clamping, and facilitate the clamping.

An extending portion is disposed on a side of an inner side of the clamping member I-7 (that is close to the support frame I-1-2). The extending portion is connected to one end of a link I-4 by using a connecting pin I-3, and an other end of the connecting rod I-4 is connected to a cylinder I-12 by using a connecting member I-10. The links I-4 of a same quantity as that of the clamping claws I-2 form a connecting rod mechanism, so as to realize synchronous connecting rod mechanism of the clamping claws I-2. In this way, the positions of the clamping claws I-2 can be adjusted to be applicable to the hub V having a different size and specification.

Further, a mounting hole is correspondingly provided on the gasket I-8 and the body I-2-2. A pressure sensor I-13 is disposed in the mounting hole. A clamping force of the clamping claw I-2 during snug clamping is detected by using the pressure sensor I-13, to determine whether the clamping is stable. When values of the three clamping forces are almost the same, it indicates that the clamping is stable, and the clamping force can be detected every time the hub is clamped. When the clamping force is enough for snug clamping, the cylinder I-12 may be controlled to stop the ventilation to prevent the damage to the hub V due to an excessively large clamping force.

Figure 7:
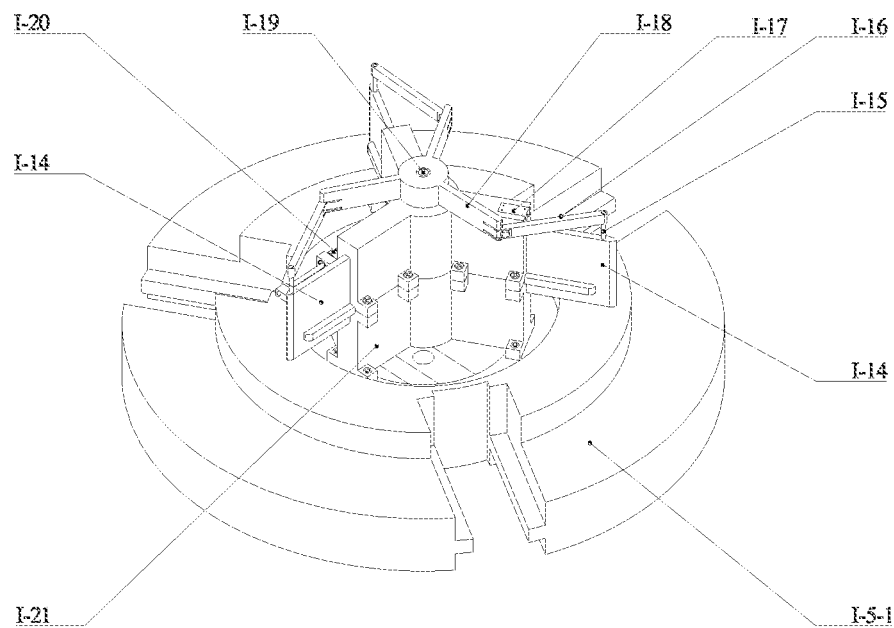
FIG. 7 is a three-dimensional view of a self-positioning apparatus according to Embodiment I of the present invention.
Figure 8:
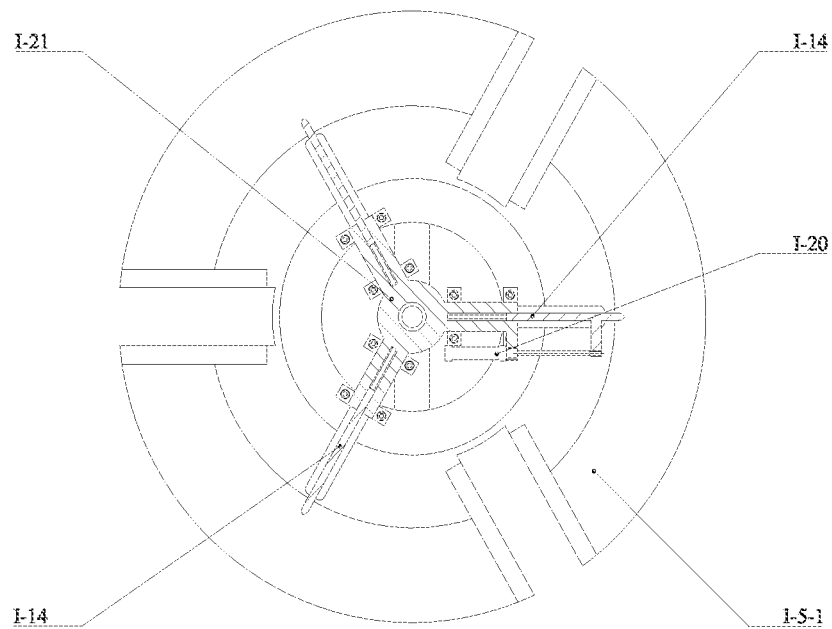
FIG. 8 is a top cross-sectional view of a self-positioning apparatus according to Embodiment I of the present invention.

Further, as shown in FIG. 7 and FIG. 8, the positioning apparatus I-5 includes a movable platform I-5-1 and a positioning module. The positioning module includes a filling frame I-21, internal filling parts I-14, a connecting frame I-18, a link I-16, and a cylinder I-20. A shape of the movable platform I-5-1 matches the fixed platform I-1. In this embodiment, the movable platform I-5-1 is designed as a circular truncated cone shape, and a protruding part of the movable platform is configured to be inserted into the inner rim of the hub V. A plurality of mounting grooves are provided in the circumferential direction of the movable platform I-5-1, and positions of the mounting grooves correspond to the mounting grooves of the fixed platform I-1. The movable member I-9 (such as a slider) is slidably connected to the mounting groove.

The filling frame I-21 may be detachably mounted at a central position of the movable platform I-5-1, a track groove is provided on a side wall of the filling frame I-21, and one end of the internal filling part I-14 extends into and is slidably connected to the track groove. The filling frame I-21 is disposed to have a star-shaped structure. In this embodiment, the filling frame I-21 has three support arms, and an included angle between adjacent support arms is 120°. The support arm has a cuboid structure, and a track groove is provided on an end face of the support arm parallel to a Z-axis direction.

The internal filling part I-14 is configured to position the inner rim of the hub V, and is a connecting member that is functionally named. One end of the internal filling part is filled in the track groove, and therefore the internal filling part I-14 is defined. In this embodiment, three internal filling parts I-14 are disposed to stably position the inner rim of the hub V. It may be understood that, in other embodiments, more than three internal filling parts I-14 may also be disposed. A sliding track and the track groove are disposed on two side walls of the internal filling part I-14 to form a sliding pair.

Further, a connecting shaft I-19 is disposed in the center of the filling frame I-21, the connecting shaft I-19 extends out of the top of the filling frame I-21 by a certain distance, and the connecting shaft I-19 is connected to the connecting frame I-18 by using a bearing. A shape of the connecting frame I-18 matches the filling frame I-21. That is, the connecting frame I-18 has three extending ends that are evenly spaced, and each extending end is connected to one link I-16. An end of the link I-16 that is away from the connecting frame I-18 is connected, by using the connecting pin I-15, to an end of the internal filling part I-14 that is away from the filling frame I-21.

One internal filling part I-14 is connected to the cylinder I-20. During the operation, the cylinder I-20 is ventilated to drive the internal filling part I-14 connected to the cylinder to move outward, and the power is transmitted to other two internal filling parts I-14 by using the link I-16 and the connecting frame I-18. In this way, the three internal filling parts I-14 are moved synchronously to position the inner rim of the hub V. A displacement sensor I-17 is mounted to the internal filling part I-14 for detecting the displacement of the internal filling part I-14. When the internal filling part I-14 stops moving, the displacement sensor I-17 transmits a signal to a control system to stop ventilating the cylinder I-20.

The positioning apparatus I-5 of this embodiment achieves self-positioning by using the internal filling parts, which is similar to the positioning of the inner center of the hub V by using a spindle, so as to ensure the accuracy by means of a relatively small contact area. Self-positioning is performed before clamping to avoid defects in the blank.

Embodiment II

This embodiment provides an automobile hub fixture. The automobile hub fixture includes a fixture body and a positioning apparatus I-5. The positioning apparatus I-5 is configured to position a hub V, and the fixture body is configured to clamp the hub V. A structure of the fixture body is the same as that in Embodiment I, and details are not described herein again.

Figure 9:
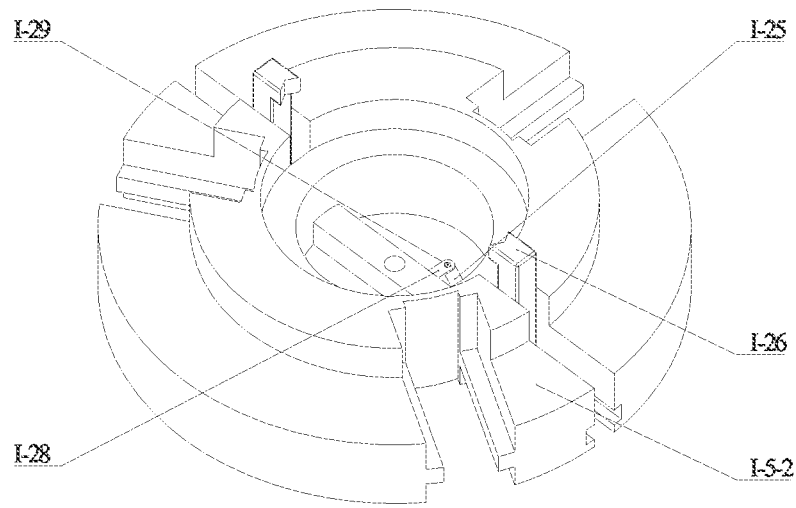
FIG. 9 is a three-dimensional view of a self-positioning apparatus according to Embodiment II of the present invention.
Figure 10:
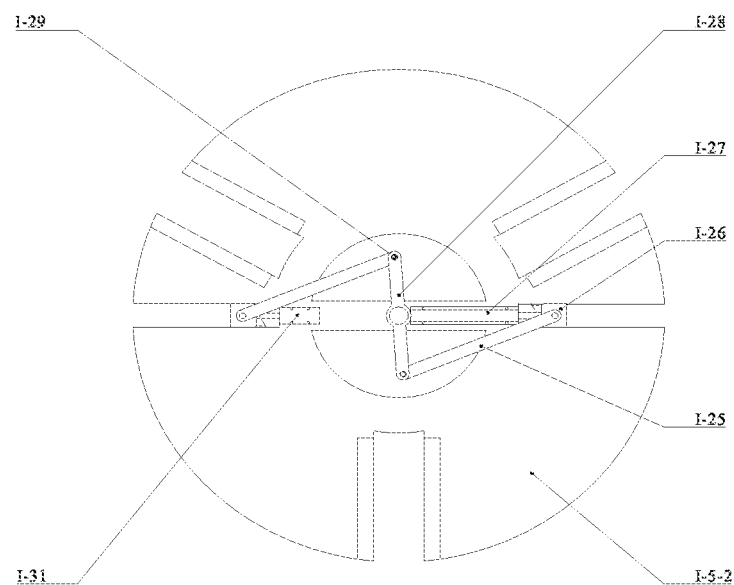
FIG. 10 is a top view of a self-positioning apparatus according to Embodiment II of the present invention.

As shown in FIG. 9 and FIG. 10, the positioning apparatus I-5 includes a movable platform I-5-2 and a positioning module. The positioning module includes a positioning block I-26, a cylinder I-27, a first link I-28, a second link I-25, and the like. A shape of the movable platform I-5-2 matches a fixed platform I-1, and mounting grooves are also provided in the movable platform I-5-2 circumferentially corresponding to the mounting grooves of the fixed platform I-1. The mounting grooves of the movable platform I-5-2 and the movable member I-9 form a sliding pair.

In this embodiment, the movable platform I-5-2 is designed as a circular truncated cone shape, and a protruding part of the movable platform is configured to be inserted into an inner rim of the hub V. A sliding groove is symmetrically provided radially in the movable platform I-5-2, and a positioning block I-26 is disposed in each of the two sliding grooves. The positioning block I-26 has a certain height. A displacement sensor I-31 configured to detect the displacement of the positioning block I-26 is mounted to the movable platform I-5-2.

A center of the movable platform I-5-2 is rotatably connected to the first link I-28, and two ends of the first link I-28 each are connected to one end of the second link I-25 by using a connecting pin I-29. An other end of the second link I-25 is connected to the positioning block I-26. One positioning block I-26 is connected to a cylinder I-27. One of the positioning blocks I-26 is driven by the cylinder I-27 to move toward the center of the circle, and the power is transmitted to another positioning block I-26 by using the second link I-25 and the first link I-28. In this way, the two positioning blocks I-26 move synchronously toward the center of the circle to position an outer rim of the hub V.

The positioning block I-26 in this embodiment adopts a V-shaped block, and the V-shaped block may be used to determine the center of the circle. The V-shaped block is designed to retract centripetally, to realize the positioning of a center of a circle of an outer surface.

Embodiment III

This embodiment provides an automobile hub fixture. The automobile hub fixture includes a fixture body and a positioning apparatus I-5. The positioning apparatus I-5 is configured to position a hub V, and the fixture body is configured to clamp the hub V. A structure of the fixture body is the same as that in Embodiment I, and details are not described herein again.

Figure 11:
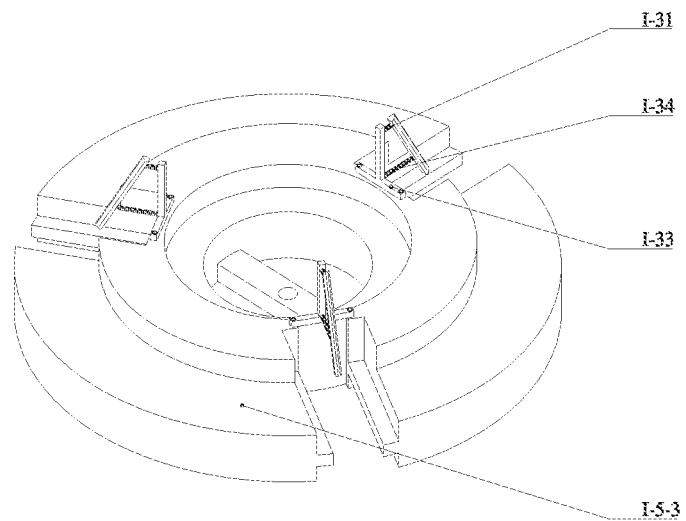
FIG. 11 is a three-dimensional view of a self-positioning apparatus according to Embodiment III of the present invention.

As shown in FIG. 11, the positioning apparatus I-5 includes a movable platform I-5-3 and a positioning module. The positioning module includes a positioning plate I-31 and a spring I-34. A shape of the movable platform I-5-3 matches the fixed platform I-1. The movable platform I-5-3 is designed as a circular truncated cone shape, and a protruding part of the movable platform is configured to be inserted into an inner rim of the hub V. Mounting grooves are also provided in the movable platform I-5-3 circumferentially corresponding to the mounting grooves of the fixed platform I-1. The mounting grooves of the movable platform I-5-3 and the movable member I-9 form a sliding pair.

Further, a plurality of connecting members I-33 are circumferentially disposed on the movable platform I-5-3. The connecting members I-33 are disposed corresponding to the mounting grooves. The connecting members I-33 are connected to positioning plates I-31 by using a plurality of springs I-34 having different lengths, so that each positioning plate I-31 is inclined at a set angle. An included angle between the positioning plate I-31 and a Z-axis direction is an acute angle.

In this embodiment, the positioning plate I-31 includes three positioning plates. The hub V is placed on the movable platform I-5-3, and the hub V is in contact with the positioning plate I-31. The spring I-34 retracts to generate thrust on the hub V, so as to realize the positioning of the inner rim of the hub V. Under an action of the gravity of the hub V and the elastic force of the spring I-34, the positioning is achieved by means of static equilibrium.

Embodiment IV

Figure 12:
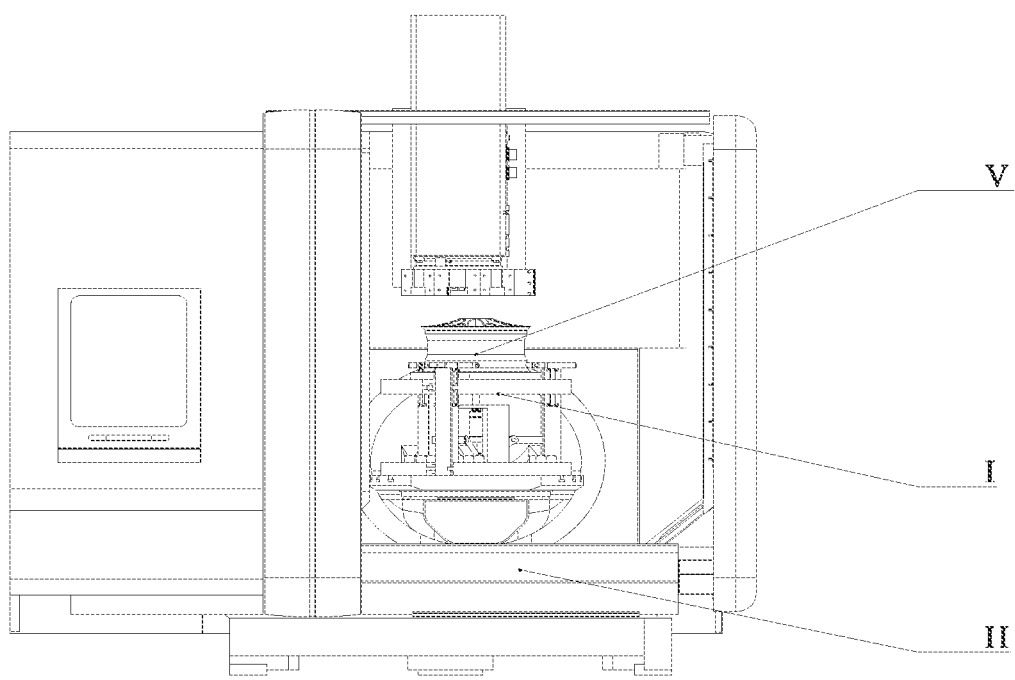
FIG. 12 is a schematic structural diagram of a machining device according to Embodiment IV of the present invention.

This embodiment provides an automobile hub machining device. As shown in FIG. 12, the automobile hub machining device includes a machine tool II, a fixture I, and a minimal quantity lubrication apparatus XII. The fixture I and the minimal quantity lubrication apparatus XII are mounted to the machine tool II, and a control system of the minimal quantity lubrication apparatus is connected to the machine tool. The minimal quantity lubrication apparatus XII provides a working condition of minimal quantity lubrication for the machine tool II, to ensure cleaner machining and better quality. The fixture I adopts the structure described in Embodiment I or Embodiment II or Embodiment III.

In this embodiment, the machine tool II is a machine tool structure in the prior art, and details are not described herein again.

Further, the fixture I is connected to a machine tool spindle, the hub V is positioned and clamped on the machine tool II by the fixture I, and the hub V is machined by a rotary turret above the machine tool II.

Figure 13:
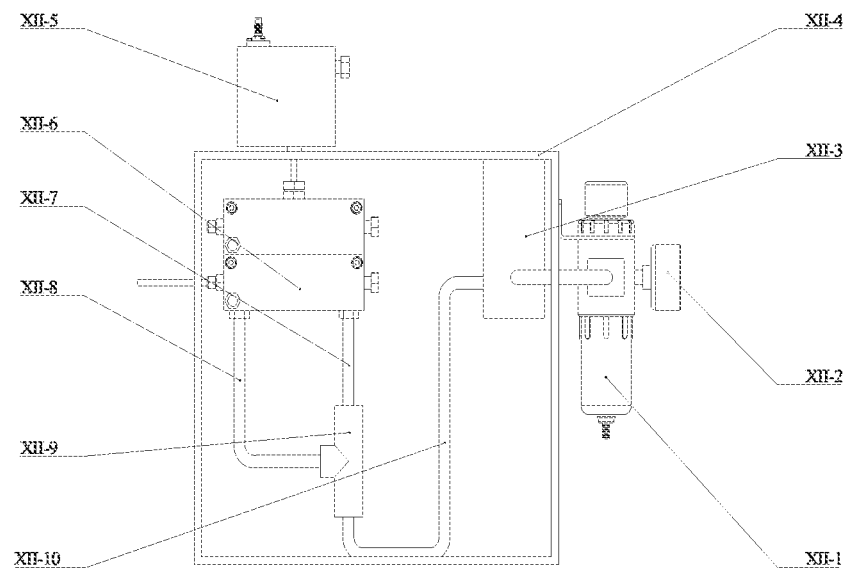
FIG. 13 is a schematic structural diagram of a minimal quantity lubrication apparatus according to Embodiment IV of the present invention.

Further, as shown in FIG. 13, the minimal quantity lubrication apparatus XII includes a box XII-4, an oil box XII-5, an oil pump XII-6, a gas filter XII-1, a barometer XII-2, an air pump XII-3, and the like. The oil box XII-5 is mounted to a top of the box XII-4, the oil pump XII-6 is mounted inside the box XII-4, and the oil box XII-5 is connected to an input end of the oil pump XII-6 and is configured to supply oil to the oil pump XII-6. An output end of the oil pump XII-6 is connected to an oil delivery pipe XII-7 and an output pipe XII-8, and the oil delivery pipe XII-7 and the output pipe XII-8 are connected to a gas delivery pipe XII-10 by using an oil-gas mixing apparatus XII-9. The gas delivery pipe XII-10 is connected to the air pump XII-3, and the air pump XII-3 is mounted to the box XII-4.

The air pump XII-3 is connected to the gas filter XII-1 mounted to outside of the box XII-4, and the gas filter XII-1 is equipped with the barometer XII-2 for detecting an air pressure of the system. The air pump XII-3 conveys the pressurized gas to the oil-gas mixing apparatus XII-9 by using the gas delivery pipe XII-10. The minimal quantity lubrication oil in the oil box XII-5 first enters the oil pump XII-6 by using the oil delivery pipe XII-7, and the oil pump XII-6 provides power to deliver the oil to the oil-gas mixing apparatus XII-9. The minimal quantity lubrication oil is mixed with the gas to be sprayed into a workspace to provide a lubricating effect for the operation.

The minimal quantity lubrication technology is a near dry lubrication technology. A cutting fluid used in the technology is green plant-based. The cutting fluid does not cause harm to the human body and pollute the environment either, and can be biodegraded. The minimal quantity lubrication method can meet the requirement for hub machining, so as to ensure the machining quality, and no pollution is caused.

Embodiment V

Figure 14:
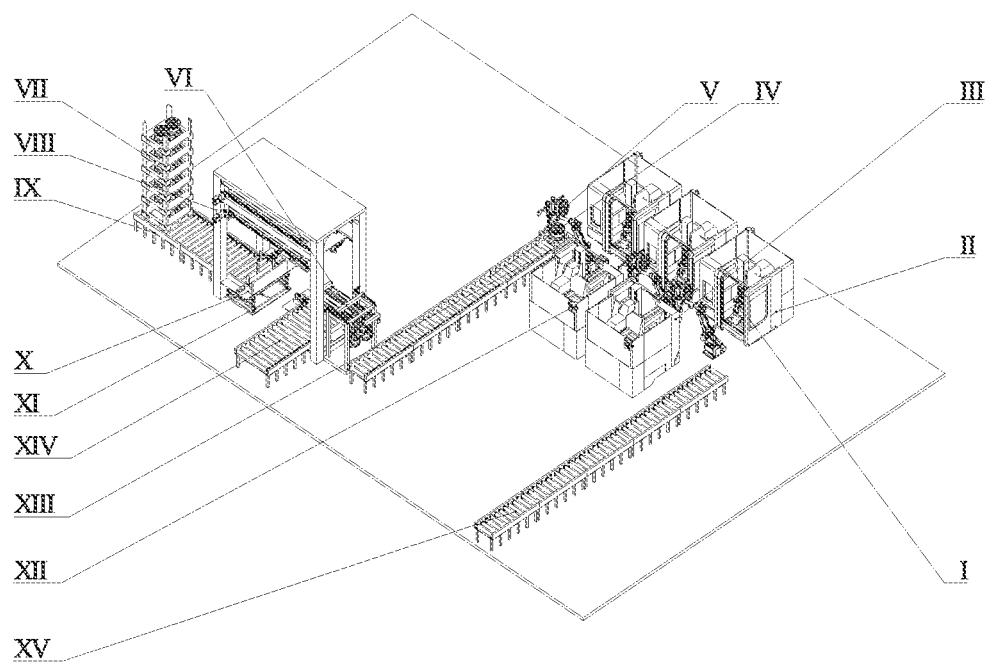
FIG. 14 is a three-dimensional view of a production line according to Embodiment V of the present invention.

This embodiment provides an automobile hub machining and production line. As shown in FIG. 14, the automobile hub machining and production line includes a loading system, a plurality of machining devices, a plurality of loading and unloading manipulators III, and a catching table XV. The loading system is configured to transport a hub blank to a loading station, the hub blank is placed on the machining device by the loading and unloading manipulator III, and the hub V machined by the machining device is then placed on the catching table XV by the loading and unloading manipulator III and is outputted by the catching table XV. In this embodiment, the loading and unloading manipulator III includes a plurality of loading and unloading manipulators. The loading system is disposed on a side of a first loading and unloading manipulator III, and the catching table XV is disposed on an other side of a last loading and unloading manipulator III.

The machining device adopts the structure described in Embodiment IV, and details are not described herein again.

Figure 15:
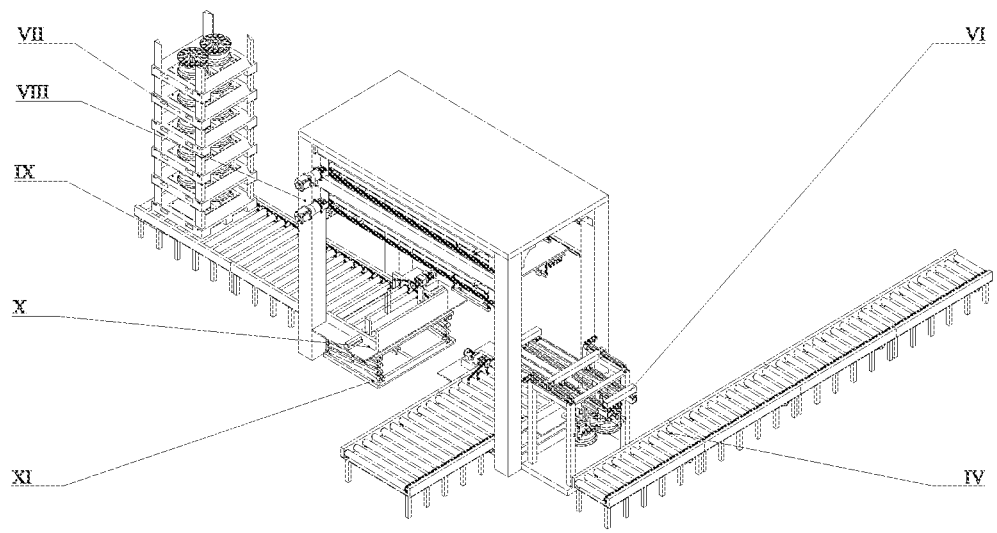
FIG. 15 is a three-dimensional view of a loading system according to Embodiment V of the present invention.

Further, as shown in FIG. 15, the loading system includes a hub grabbing manipulator VI, a detachable rack VII, a material separating unit VIII, a first roller table IX, a second roller table X, a third roller table XIV, a fourth roller table IV, a lifting platform XI, and a positioning roller table XIII. The first roller table IX is located at a feeding end of a material separating unit II, the material separating unit II is disposed above the first roller table IX, and the second roller table X is disposed at an end (an output end) of the first roller table IX. The third roller table XIV is disposed at a catching end of the material separating unit II, and a conveying direction of the third roller table XIV is perpendicular to a conveying direction of the first roller table IX. The fourth roller table IV is disposed on a side of the third roller table that is away from the second roller table X, and a conveying direction of the fourth roller table IV is parallel to that of the third roller table XIV. A hub grabbing manipulator VI is disposed between the fourth roller table IV and the third roller table XIV.

Further, the detachable rack VII is composed of a plurality of detachable rack units. The hub V may be placed on each rack unit. The multi-layer design can increase a quantity of the hubs V to be conveyed. The rack unit is designed as a rectangular frame structure, and a plug-in structure is adopted for adjacent rack units. The rack units can be easily separated from each other by using the plug-in structure.

A lifting platform XI is mounted to the bottom of the second roller table X, and a height of the second roller table X may be adjusted by using the lifting platform XI. A limiting plate is disposed at an end of the second roller table X. The detachable rack VII filled with the hub V is conveyed to the second roller table X by using the first roller table IX, and a height of the detachable rack VII is adjusted by using the lifting platform XI. The rack is split by using the material separating unit VIII after being positioned, and the detachable rack VII is conveyed to the third roller table XIV at the other end. The hub grabbing manipulator VI grabs the hub V from the third roller table XIV to the fourth roller table IV to convey the hub to the machining device.

Figure 17:
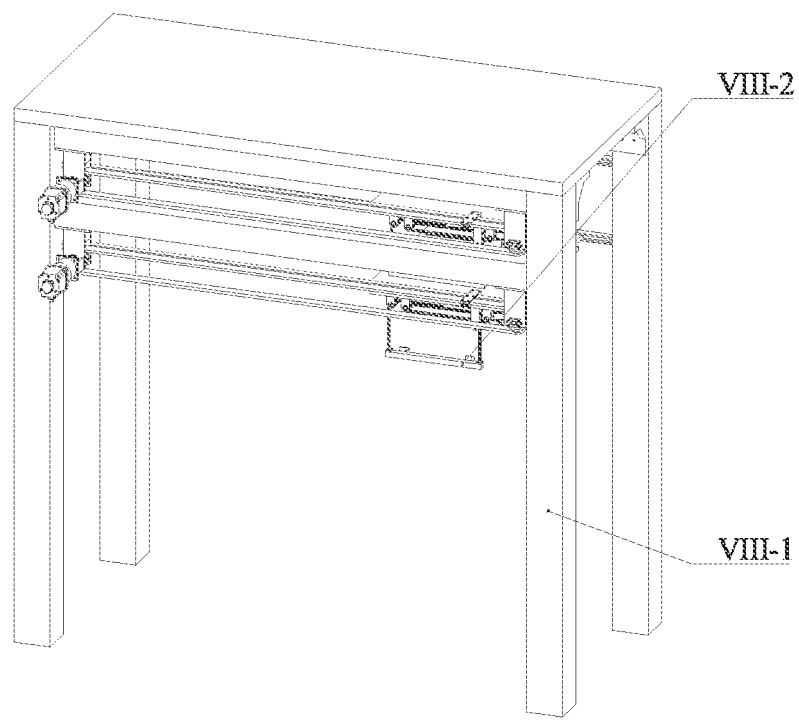
FIG. 17 is a three-dimensional view of a material separating unit according to Embodiment V of the present invention.

Further, as shown in FIG. 17, the material separating unit VIII includes a support frame VIII-1. A rack insertion and taking apparatus VIII-2 is mounted to a top of the support frame VIII-1 by using a synchronous belt transmission mechanism. The synchronous belt transmission mechanism drives the rack insertion and taking apparatus VIII-2 to move in a length direction of the support frame VIII-1. The length direction of the support frame VIII-1 is consistent with the conveying direction of the first roller table IX.

Further, the rack insertion and taking apparatus VIII-2 includes an insertion and taking plate and a height adjustment mechanism connected to the insertion and taking plate. The insertion and taking plate is lowered by using the height adjustment mechanism to be aligned to a rack unit, to realize the insertion and taking of the rack unit. In this embodiment, a plurality of insertion and taking blocks are disposed on a side of the insertion and taking plate. Insertion and taking grooves corresponding to the insertion and taking blocks are provided in the rack unit, thereby realizing the actions of inserting and taking. The height adjustment mechanism may be realized by using the existing technology, such as a chain transmission mechanism, and the like.

Figure 18:
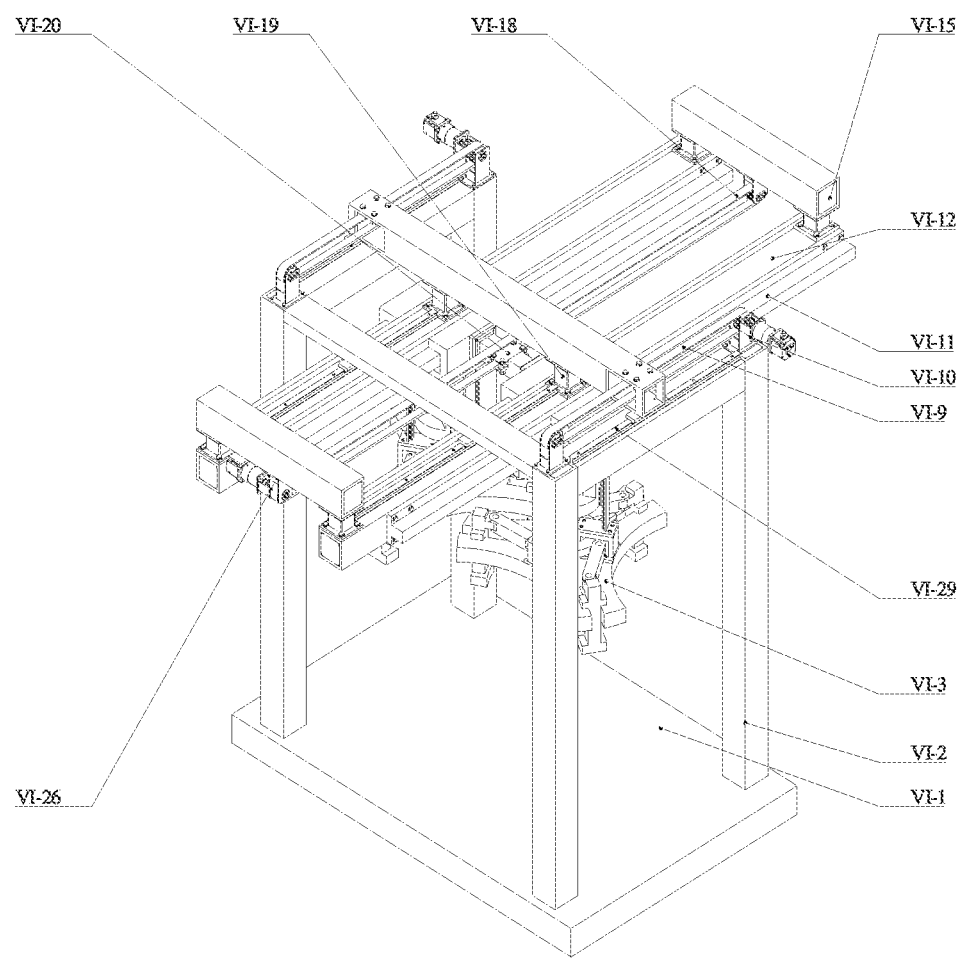
FIG. 18 is a three-dimensional view of a hub grabbing manipulator according to Embodiment V of the present invention.
Figure 19:
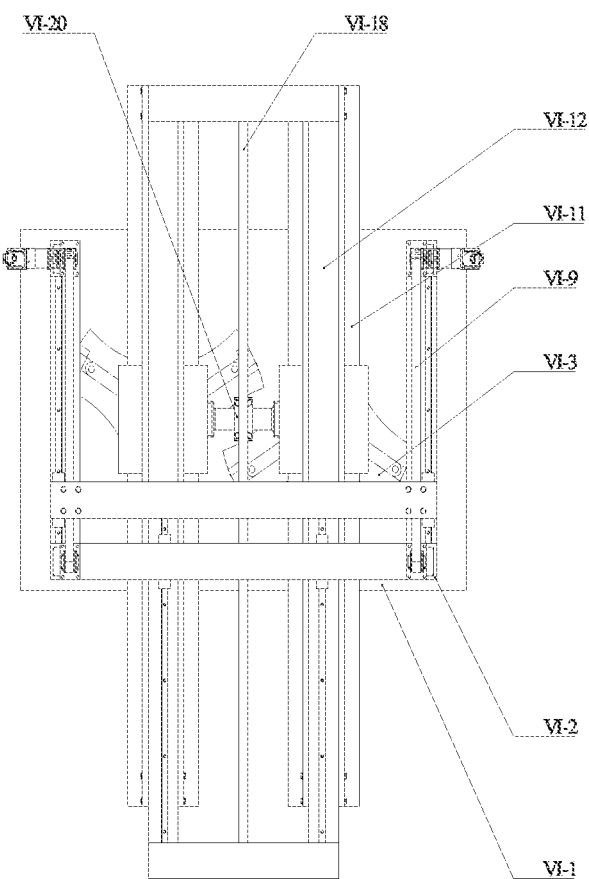
FIG. 19 is a top view of a hub grabbing manipulator according to Embodiment V of the present invention.

Further, as shown in FIG. 18 and FIG. 19, the hub grabbing manipulator VI includes a bottom plate VI-1 and a support frame VI-2 mounted to a top of the bottom plate VI-1. A plurality of mechanical claws VI-3 are disposed in the support frame VI-2. In this embodiment, two mechanical claws VI-3 are disposed. The mechanical claw VI-3 is away from the grasping end and is slidably connected to a track VI-11. The track VI-11 is mounted to a support frame VI-12. A disposing direction of the support frame VI-12 is consistent with the conveying direction of the first roller table IX. The two mechanical claws VI-3 are connected by using a connecting member VI-20. The connecting member VI-20 is fixed to a synchronous belt mechanism VI-18. The synchronous belt mechanism VI-18 is connected to a driving motor VI-26. The synchronous belt mechanism VI-18 is driven by the driving motor VI-26, so that the mechanical claw VI-3 moves along the track VI-11 to realize the grabbing of the hub V.

The top of the support frame VI-12 is connected to the connecting frame VI-19. Two ends of the connecting frame VI-19 are respectively connected to the synchronous belt mechanism VI-9. The synchronous belt mechanism VI-9 is connected to a driving motor VI-10. The synchronous belt mechanism VI-9 and the driving motor VI-10 form a Y-axis movable apparatus. The driving motor VI-10 drives the synchronous belt mechanism VI-9 to drive the connecting frame VI-19 and the support frame VI-12 to move, to prevent the support frame VI-12 from affecting the lifting of the lifting platform.

Figure 16:
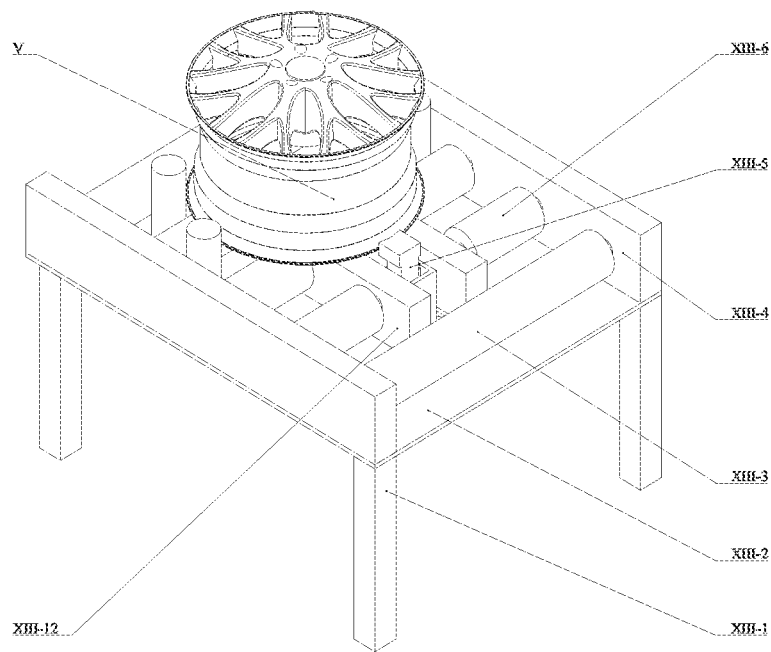
FIG. 16 is a three-dimensional view of a positioning roller table according to Embodiment V of the present invention.

Further, a positioning roller table XIII is disposed at an output end of the fourth roller table IV. As shown in FIG. 16, the positioning roller table XIII includes a bottom plate XIII-2 and a first mounting plate XIII-4 symmetrically mounted to two sides of the bottom plate XIII-2. A plurality of support legs XIII-1 are mounted to the bottom of the bottom plate XIII-2, and a plurality of rollers XIII-3 are connected between two first mounting plates XIII-4. A positioning area is provided on an upper surface of the bottom plate XIII-2. Two second mounting plates XIII-12 are disposed in the positioning area of the bottom plate XIII-2, and the second mounting plate XIII-12 and the first mounting plate XIII-4 are parallel and spaced apart by a certain distance. A roller XIII-6 is rotatably disposed between the second mounting plate XIII-12 and the first mounting plate XIII-4. A positioning block XIII-5 is disposed between the two second mounting plates XIII-12. The positioning block XIII-5 is connected to the cylinder. The cylinder drives the positioning block XIII-5 to move along a space between the second mounting plates XIII-12, so as to realize the positioning of the side of the hub V. A plurality of protruding blocks are mounted to the bottom plate XIII-2 at intervals, and the protruding block is mated with the positioning block XIII-5 to limit positions of the hub V in the circumferential direction.

Figure 20:
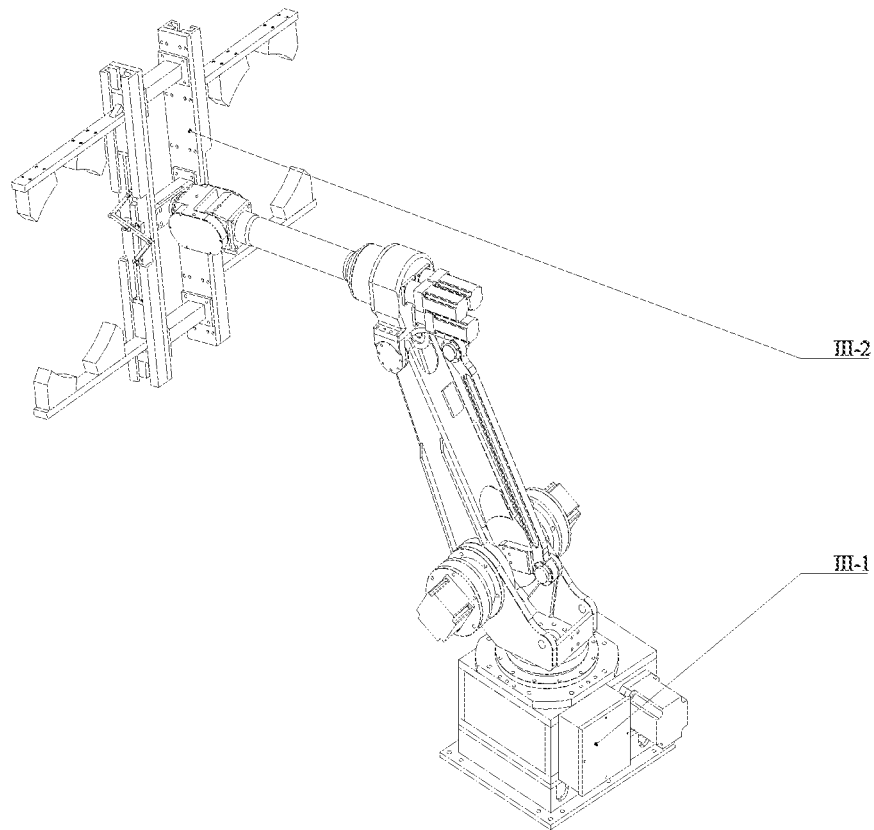
FIG. 20 is a three-dimensional view of a loading and unloading manipulator according to Embodiment V of the present invention.

Further, as shown in FIG. 20, the loading and unloading manipulator III includes a mechanical arm III-1 and a manipulator claw III-2. The manipulator claw III-2 is mounted to an end of the mechanical arm III-1. The mechanical arm III-1 adopts the existing structure, and details are not described herein again.

Figure 21:
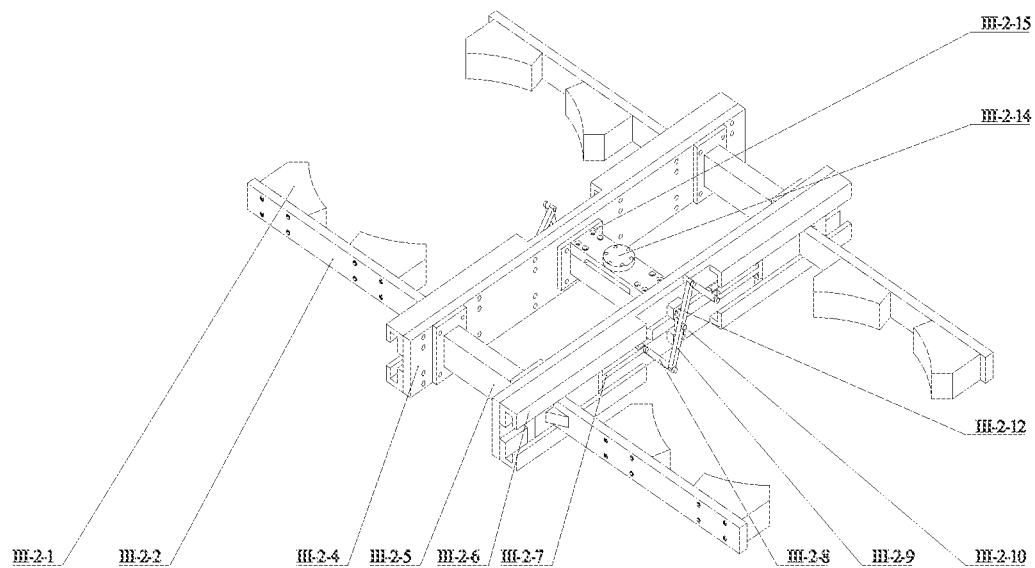
FIG. 21 is a three-dimensional view of a manipulator claw of a loading and unloading manipulator according to Embodiment V of the present invention.

As shown in FIG. 21, the manipulator claw III-2 includes a connecting frame III-2-5, a mounting plate III-2-4, a slide track groove III-2-6, a connecting rod mechanism, a clamping member III-2-1, and a clamping plate III-2-2. The two mounting plates III-2-4 are disposed in parallel. A plurality of connecting frames III-2-5 are mounted at intervals between the two mounting plates. The connecting frame III-2-5 is perpendicular to the mounting plate III-2-4, and the connecting frame III-2-5 and the mounting plate III-2-4 form a frame structure. In this embodiment, the connecting frame III-2-5 has an I-shaped structure. For example, three connecting frames III-2-5 are disposed. A flange connecting member III-2-14 is mounted to the connecting frame III-2-5 in the middle, and the flange connecting member III-2-14 is detachably connected to the mechanical arm III-1.

Further, the slide track groove III-2-6 is mounted to an opposite side of the mounting plate III-2-4. Each slide track groove III-2-6 is slidably connected to two clamping plates III-2-2, and the two clamping plates III-2-2 are connected by using a connecting rod mechanism connecting rod mechanism. A distance between the two clamping plates III-2-2 is changed by using the two clamping plates III-2-2. A plurality of clamping members III-2-1 are mounted at intervals on an inner side of the clamping plate III-2-2 (a side close to each other). The clamping member III-2-1 is a tooth-shaped structure, and the hub V is clamped by using the clamping member III-2-1. The two clamping plates III-2-2 disposed opposite to each other form a clamping space by using the clamping member III-2-1. The manipulator claw III-2 of this embodiment has two clamping spaces opposite to each other, so that two hubs V can be clamped at a time.

Further, the connecting rod mechanism includes a third link III-2-9, a fourth link III-2-8, and a fifth link III-2-7. A center of the third link III-2-9 is connected, by using a connecting pin III-2-10, to the connecting member III-2-12 mounted to a middle position of the slide track groove III-2-6. Two ends of the third link III-2-9 are respectively connected to one end of the fifth link III-2-7 by using a fourth link III-2-8. An other end of the fifth link III-2-7 is connected to the clamping plate III-2-2. For the two clamping plates III-2-2 corresponding to each slide track groove III-2-6, one of the clamping plates III-2-2 is connected to a cylinder, and the cylinder drives the clamping plate III-2-2 to move along the slide track groove III-2-6. The power is transmitted to the other clamping plate III-2-2 by using the connecting rod mechanism, so that the two clamping plates III-2-2 on the same side move synchronously to realize the clamping or loosening of the hub V.

In this embodiment, the mechanical arm III-1 realizes free movement and precise positioning by using each joint, thereby adjusting the position. The manipulator claw III-2 has two clamping claws (clamping space) capable of clamping the hub V. One end removes the machined hub V, and the other end places the machined hub V on the machine tool to achieve continuous machining. During the clamping of the hub V, the cylinder is first started to drive the clamping plate III-2-2 to retract toward the center, and the power is transmitted to the clamping plate III-2-2 at the other end by using the connecting rod mechanism. In this way, the clamping plates III-2-2 retract inward simultaneously to be close to the hub V. The clamping member III-2-1 is in contact with the hub V to position and clamp the hub V. The mechanical arm III-1 rotates to take out the hub V after the clamping, and puts the hub V clamped on the other side into a fixture I.

Five machining devices are used as an example to describe the working principle of this embodiment.

The detachable rack VII filled with the hub V is conveyed into the second roller table X through the first roller table IX. The rack is split by the material separating unit VIII after being positioned, and the height of the detachable rack VII is adjusted by using the lifting platform XI. The detachable rack VII is moved to the third roller table by using the material separating unit VIII, and the hub grabbing manipulator VI grabs the hub V onto the fourth roller table IV to a machining apparatus. The positioning roller table XIII at the end of the fourth roller table IV positions the hub V, the loading and unloading manipulator III transports the hub V to the machine tool II, and the fixture I clamps the hub V for machining.

In the machining apparatus, five machine tools II include four vertical lathes and one machining center. In this way, five procedures are performed on the hub V. Specifically, the first vertical lathe is configured to perform rough turning on a tire mount, a radius of a front rim, and an assembling position of a cover opening of a hub. The second vertical lathe is configured to perform rough turning on a rear outer rim of the hub, a diameter of a center hole, and a mounting face, and perform semi-finishing turning on a tire mount, a rear outer rim of the hub, a diameter of the center hole, and a mounting face. The third vertical lathe is configured to perform semi-finishing turning on a front rim radius and an assembling position of a cover opening and perform finish turning on a tire mount, a front rim radius, and an assembling position of a cover opening. The fourth vertical lathe is configured to perform finish turning on a tire mount, a rear outer rim of the hub, the diameter of the center hole, and the mounting face. The machining center is configured to drill a mounting hole and a valve hole.

Three loading and unloading manipulators III are mounted. The first loading and unloading manipulator III is configured to grab the hub V positioned on the first roller table XIII, perform the loading and unloading of the first vertical lathe and the loading of the second vertical lathe. The second loading and unloading manipulator III is used for the unloading of the second vertical lathe, the loading and unloading of the third vertical lathe, and the loading of the fourth vertical lathe. The third loading and unloading manipulator III is used for the unloading of the fourth vertical lathe and the loading and unloading of the machining center, and used to place the hub on the catching table XV to finish the machining.

The above descriptions are merely preferred embodiments of this application and are not intended to limit this application. For a person skilled in the art, this application may have various modifications and changes. Any modification, equivalent replacement, or improvement made without departing from the spirit and principle of this application shall fall within the protection scope of this application.

What is claimed is:

1. An automobile hub fixture, comprising:
a fixture body, comprising a fixed platform and a plurality of clamping claws arranged at intervals in a circumferential direction of the fixed platform, wherein the clamping claws are configured to clamp an outer rim of a hub, the clamping claws are connected to a driving member by using a connecting rod mechanism, and the driving member drives the clamping claws to radially move along the fixed platform; and
a positioning apparatus, comprising a movable platform slidably connected to the clamping claws, wherein a positioning module configured to position an inner rim or the outer rim of the hub is mounted to the movable platform.

2. The automobile hub fixture according to claim 1, wherein each clamping claw comprises a body, a clamping member attachable to a surface of the hub is connected to one end of the body, a gasket is disposed between the clamping member and the body,
a mounting groove is correspondingly provided in each of the fixed platform and the movable platform in the circumferential direction, and the each clamping claw is slidably connected to the mounting groove.

3. The automobile hub fixture according to claim 1, wherein the positioning module comprises a filling frame mounted to the movable platform, the filling frame is slidably connected to a plurality of internal filling parts in a circumferential direction, a connecting shaft is mounted to a center of the filling frame, and the connecting shaft is rotatably connected to a connecting frame; and
the connecting frame is connected to the internal filling parts by using a link, and each internal filling part is connected to a cylinder to change an extending length of the each internal filling part relative to the filling frame.

4. The automobile hub fixture according to claim 1, wherein a sliding groove is symmetrically provided radially in the movable platform, the positioning module comprises positioning blocks respectively disposed in the sliding grooves, the two positioning blocks are connected by using the connecting rod mechanism, one of the positioning blocks is connected to a cylinder, and a distance between the two positioning blocks is changed by the cylinder, so that the positioning blocks are attached to the outer rim of the hub.

5. The automobile hub fixture according to claim 1, wherein the positioning module comprises a positioning plate and a connecting member, and the connecting member is perpendicular to the movable platform and is connected to the positioning plate by using a plurality of springs having different lengths, so that the positioning plate is inclined at a set angle.

6. An automobile hub machining device, comprising the fixture according to claim 1, wherein the fixture is mounted to a machine tool, and a minimal quantity lubrication apparatus is further mounted to the machine tool.

7. An automobile hub machining and production line, comprising the machining device according to claim 6, a loading system, a loading and unloading manipulator, and a catching table, wherein the machining device comprises a plurality of machining devices, the loading system is disposed at a side of the machining device, and the loading and unloading manipulator is configured to place a hub conveyed by the loading system on the machining device and place a machined hub on the catching table.

8. The automobile hub machining and production line according to claim 7, wherein the loading system comprises a first roller table, a second roller table, a third roller table, and a fourth roller table that are disposed in sequence, the first roller table is configured to convey a detachable rack carrying a hub, the second roller table is disposed at an output end of the first roller table, and a lifting platform is mounted to a bottom of the second roller table, a material separating unit is disposed above the first roller table, and the material separating unit is configured to place the detachable rack after being split on the third roller table; and a hub grabbing manipulator is disposed between the third roller table and the fourth roller table.

9. The automobile hub machining and production line according to claim 8, wherein the material separating unit comprises a support frame, a rack insertion and taking apparatus is disposed on a top of the support frame by using a synchronous belt transmission mechanism, and the synchronous belt transmission mechanism drives the rack insertion and taking apparatus to move in a length direction of the support frame.

10. The automobile hub machining and production line according to claim 8, wherein a positioning roller table is disposed at an output end of the fourth roller table.

* * * * *